United States Patent
Monogioudis et al.

(10) Patent No.: US 9,326,163 B2
(45) Date of Patent: Apr. 26, 2016

(54) METHODS AND SYSTEMS FOR REDUCING INTERFERENCE IN NETWORKS

(71) Applicant: Alcatel-Lucent USA Inc., Murray Hill, NJ (US)

(72) Inventors: Pantelis Monogioudis, Randolph, NJ (US); Supratim Deb, Somerset, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 216 days.

(21) Appl. No.: 13/798,693

(22) Filed: Mar. 13, 2013

(65) Prior Publication Data
US 2014/0269355 A1     Sep. 18, 2014

(51) Int. Cl.
| | |
|---|---|
| *H04L 1/00* | (2006.01) |
| *H04W 24/02* | (2009.01) |
| *H04W 52/10* | (2009.01) |
| *H04W 52/14* | (2009.01) |
| *H04W 52/24* | (2009.01) |

(52) U.S. Cl.
CPC ............ *H04W 24/02* (2013.01); *H04W 52/10* (2013.01); *H04W 52/146* (2013.01); *H04W 52/244* (2013.01)

(58) Field of Classification Search
CPC ... H04W 24/02; H04W 52/10; H04W 52/146; H04W 52/244
USPC .......................................... 370/252; 455/501
See application file for complete search history.

(56) References Cited

U.S. PATENT DOCUMENTS

| | | | |
|---|---|---|---|
| 2003/0176190 A1* | 9/2003 | Mohebbi et al. ............. | 455/436 |
| 2004/0131037 A1* | 7/2004 | Balletti et al. ............... | 370/338 |
| 2007/0153937 A1* | 7/2007 | Itkin et al. .................... | 375/297 |
| 2008/0144582 A1* | 6/2008 | Das et al. ...................... | 370/335 |
| 2010/0056171 A1* | 3/2010 | Ramprashad et al. ..... | 455/452.1 |
| 2010/0061317 A1* | 3/2010 | Gorokhov et al. ........... | 370/329 |
| 2010/0298016 A1* | 11/2010 | Madan et al. ............... | 455/501 |
| 2011/0039589 A1* | 2/2011 | Skov ............................. | 455/501 |

(Continued)

FOREIGN PATENT DOCUMENTS

| | | |
|---|---|---|
| TW | 201210378 A | 3/2012 |
| TW | 201218822 A | 5/2012 |
| WO | WO 2012/060746 | 5/2012 |

OTHER PUBLICATIONS

International Search Report and Written Opinion dated Sep. 2, 2014.

(Continued)

*Primary Examiner* — Alpus H Hsu
*Assistant Examiner* — Camquyen Thai
(74) *Attorney, Agent, or Firm* — Harness, Dickey & Pierce, P.L.C.

(57) ABSTRACT

At least one example embodiment discloses a method of controlling interference between a plurality of user equipments (UEs) in a network including a plurality of cells, each of the cells being at least one of a serving cell and neighboring cell. The method includes obtaining first path loss data of communications between the UEs and serving cells and second path loss data of communications between the UEs and neighboring cells, determining first parameters and nominal power parameters for the plurality of cells, respectively, based on the first path loss data and the second path loss data and determining nominal interferences for the plurality of cells, respectively, based on the respective first parameter and nominal power parameter.

14 Claims, 10 Drawing Sheets

(56) References Cited

U.S. PATENT DOCUMENTS

| | | | |
|---|---|---|---|
| 2011/0122789 A1* | 5/2011 | Haustein et al. | 370/252 |
| 2011/0312268 A1* | 12/2011 | Wei | 455/7 |
| 2013/0084865 A1* | 4/2013 | Agrawal et al. | 455/436 |
| 2013/0258884 A1* | 10/2013 | XU et al. | 370/252 |
| 2013/0310102 A1* | 11/2013 | Chao et al. | 455/522 |
| 2014/0112260 A1* | 4/2014 | Sorrentino | 370/329 |

OTHER PUBLICATIONS

LG Electronics, "Enhancements to Time-domain Resource Partitioning," 3GPP Draft, Aug. 16, 2011.

Wang, Y. et al., "Uplink power control in LTE heterogeneous networks," Globecom Workshops, IEEE, pp. 592-597, Dec. 3, 2012.

"3rd Generation Partnership Project; Technical Specification Group Radio Access Network; Evolved Universal Terrestrial Radio Access; Physical layer procedures," 3GPP Standard, vol. RAN WGI, No. V11.1.0, Dec. 20, 2012.

Coupechoux, M. et al., :How to Set the Fractional Power Control Compensation Factor in LTE, IEEE. 2011.

Amirijoo, M. et al., "Automatic Cell Outage Compensation,"2010.

International Search Report dated Jul. 4, 2014.

* cited by examiner

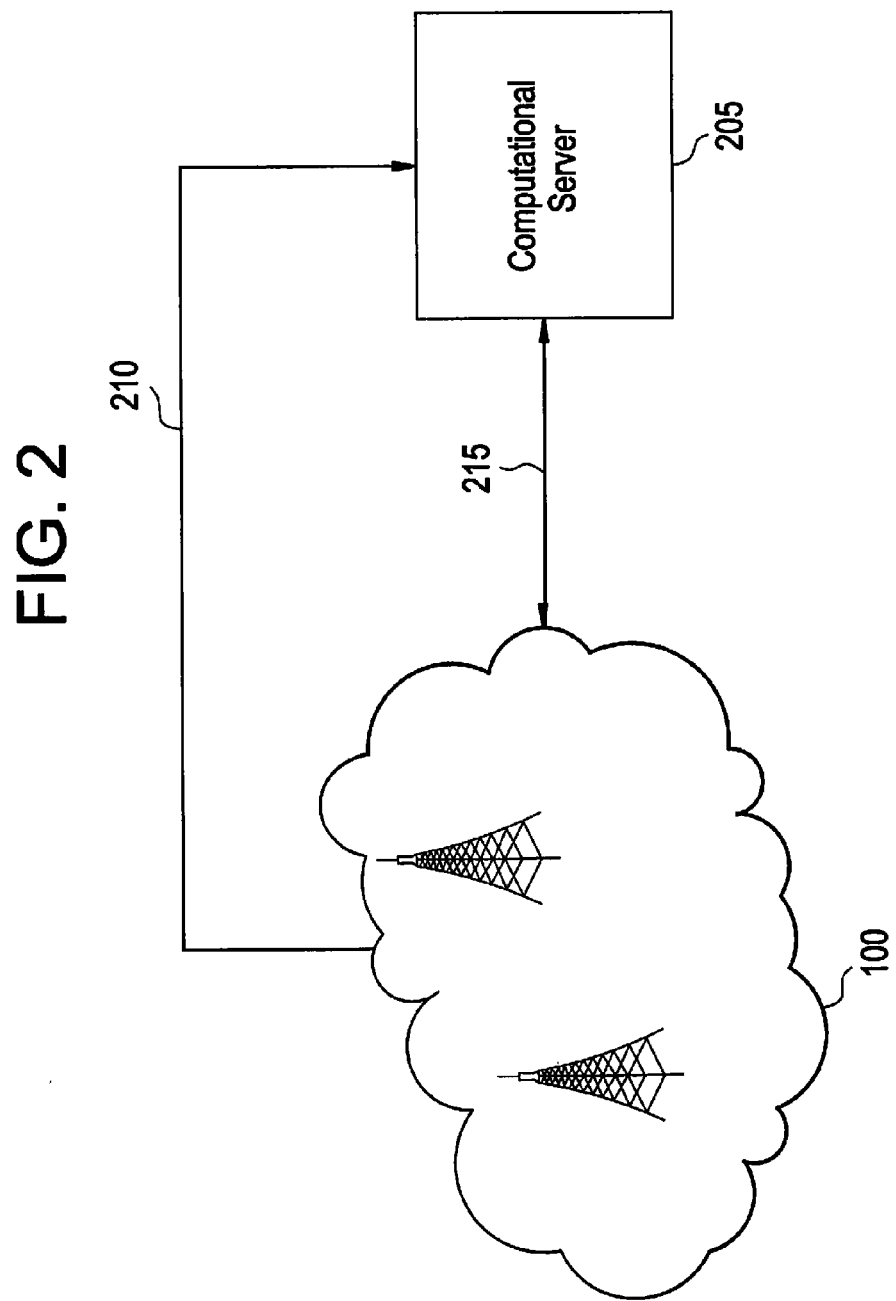

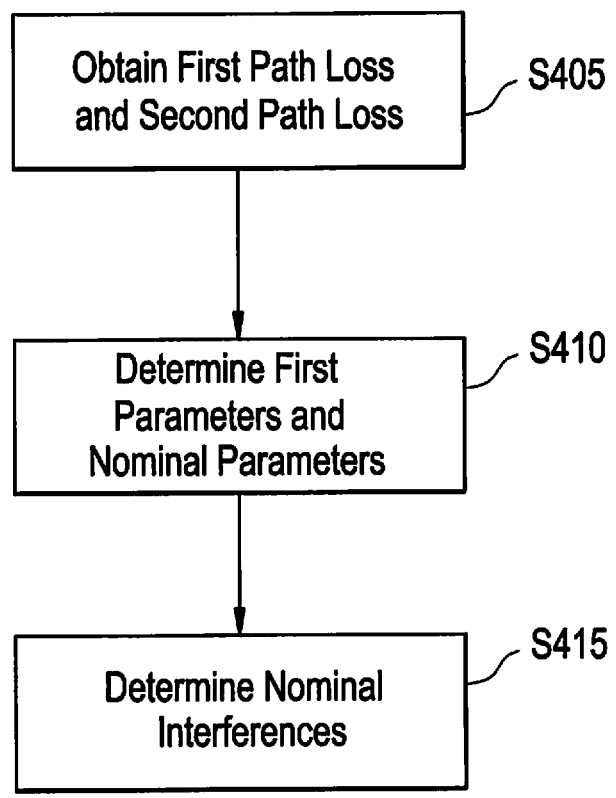

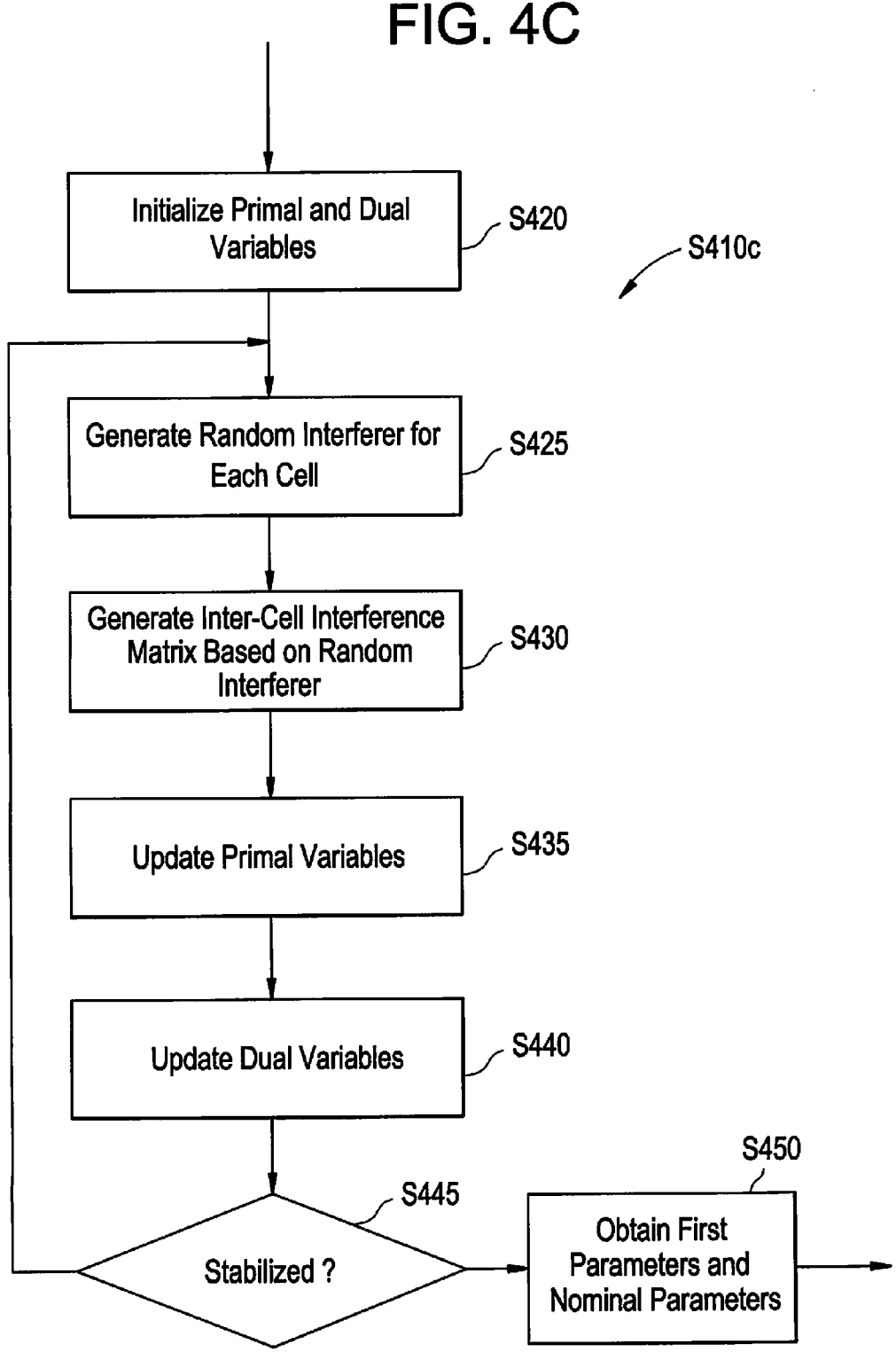

METHODS AND SYSTEMS FOR REDUCING INTERFERENCE IN NETWORKS

BACKGROUND

Heterogeneous networks (HetNets or HTNs) are now being developed wherein cells of smaller size are embedded within the coverage area of larger macro cells and the small cells could even share the same carrier frequency with the umbrella macro cell, primarily to provide increased capacity in targeted areas of data traffic concentration. Such heterogeneous networks try to exploit the spatial distribution of users (and traffic) to efficiently increase the overall capacity of the wireless network. Those smaller-sized cells are typically referred to as pico cells or femto cells, and for purposes of the description herein will be collectively referred to as small cells. Such deployments present some specific interference scenarios for which enhanced inter-cell interference coordination (eICIC) techniques would prove beneficial.

In one scenario, the small cells are pico cells, which are open to users of the macro cellular network. In order to ensure that such pico cells carry a useful share of the total traffic load, user equipments (UEs) may be programmed to associate preferentially with the pico cells rather than the macro cells, for example by biasing the received signal power of the Common Reference Symbol (CRS), a quantity that may be referred to as reference signal received power (RSRP), such that UEs that are close to a pico cell will associate with the pico cell. Despite the association, UEs near the edge of a pico cell's coverage area will suffer strong interference from one or more macro cells. In order to alleviate such interference, some subframes may be configured as "almost blank" in the macro cell. An "almost blank" subframe is a subframe with reduced transmit power (e.g., reduced from a maximum transmit power) and/or a reduced activity subframe (e.g., contains only control information as compared to a fully loaded subframe). Legacy UEs (also called terminals) expect to find the reference signals for measurements but are unaware of the configuration of these special subframes. Almost blank subframes may contain synchronization signals, broadcast control information and/or paging signals.

In order to make use of almost blank subframes (ABSs) effective (note that hereafter the term "special" or "ABS" is used), signaling is provided from the macro cell to the pico cell across the corresponding backhaul interface, known in LTE as the "X2" interface. For LTE Release 10, it has been agreed that this X2 signaling will take the form of a coordination bitmap to indicate the ABS pattern (for example with each bit corresponding to one subframe in a series of subframes, with the value of the bit indicating whether the subframe is an ABS or not). Such signaling can help the pico cell to schedule data transmissions in the pico cell appropriately to avoid interference (e.g. by scheduling transmissions to UEs near the edge of the pico cell during ABSs), and to signal to the UEs the subframes which should have low macro cellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link).

EICIC is an Interference Mitigation technique that involves the transmission of ABS from a macro cluster. During the transmission of ABS, only a subset of the broadcast channels is transmitted while PDSCH is muted. This allows underlaid small cells such as metro cells, femto cells and relays to transmit to the UEs that have selected those nodes with a better SINR.

Since LTE is a co-channel deployment (i.e., it has 1:1 frequency re-use in the different cells). The edge users' uplink performance can be severely impaired due to interference received from neighboring cells that use the same frequency due to 1:1 re-use. To mitigate the neighboring cell interference that limits the performance of edge users, the standards body has proposed the following approach: periodically, each cell sets cell-specific parameters that the associated UEs of the cell use to set their SINR target as a pre-defined function of these parameters and local path loss measurements. Precisely, the standards body has proposed a Fractional Power Control (FPC)-α scheme where a UE sets its transmits power (in dBm) according to the following relationship $$\text{Tx Power of UE} = P_0(\text{server cell}) + \alpha(\text{server cell}) * \text{Path\_Loss(between UE and server cell)} \quad (1)$$

where, parameters $P_0$ is the cell specific nominal transmit power and α is the cell-specific path loss compensation factor, both depending on the server cell of the UE. In equation (1) the transmitting power of the UE is understood to express transmitting power per Resource Block (RB).

SUMMARY

Example embodiments disclose methods and systems for reducing interference in a network.

More specifically, the FPC control scheme does not set forth how parameters such as $P_0$ and α are set at different cells. At least one example embodiment discloses determining cell specific nominal transmit power and cell specific α parameters.

At least one example embodiment discloses a method of controlling interference between a plurality of user equipments (UEs) in a network including a plurality of cells, each of the cells being at least one of a serving cell and neighboring cell. The method includes obtaining first path loss data associated with the communication links between the UEs and serving cells and second path loss data associated with the channels between the UEs and neighboring cells, determining first parameters and nominal transmit power parameters for the plurality of cells, respectively, based on the first path loss data and the second path loss data and determining nominal interferences for the plurality of cells, respectively, based on the respective first parameter and nominal transmit power parameter.

In an example embodiment, for each UE, the obtaining includes obtaining a mean path loss between the UE and the serving cell of the UE based on downlink RSRP measurements between the UE and the serving cell of the UE and obtaining a mean path loss between the UE and the neighboring cells of the UE based on downlink RSRP measurements between the UE and the neighboring cells.

In an example embodiment, the method further includes determining a joint Normal fit of a joint path loss distribution over a serving path loss and a neighboring path loss measurements reported by the plurality of the UEs, the determining first parameters and nominal transmit power parameters being based on the Normal fit of the variable.

In an example embodiment, a mean and a covariance matrix of the Normal fit are estimated via a Minimum Mean Square error criterion.

In an example embodiment, the determining first parameters and nominal transmit power parameters includes determining $$\max_{\{P_e\},\{\alpha_e\}} \sum_{u \in U} V(\gamma_u)$$

subject to, $$\gamma_u \leq P_e - (1 - \alpha_e)PathLoss(u \text{ to } e) - I_e, \forall u, u \in \text{cell-}e$$

$$I_c \geq \ln\left[\sum_{e \in \text{IntNghbr}(e)} e^{(\pi_e + \beta_c^t m_{ec} + \frac{1}{2}\beta_e^t C_{ec}\beta_e)} + N_0\right] \forall, \text{cell-}c$$

$$P_e + \alpha_e PathLoss(u \text{ to } e) \leq \ln P_{max}$$

$$\alpha_e \in [0, 1], \gamma_u \in [\gamma_{min}, \infty)$$

wherein $P_e$ is a nominal transmit power parameter for serving cell e, $\alpha_e$ is the first parameter for the serving cell e, u is the UE, $m_{ec}$ is the mean path loss vector between the serving cell e and the neighboring cell c, $C_{ec}$ is the covariance matrix, V is a utility function, and $I_c$ is an average interference at cell c, and $\gamma_u$ is a target signal-to-interference plus noise ratio of user u.

In an example embodiment, the nominal transmit power parameter for the serving cell e is $$P_0(e) = 10 \log(\exp(P_e)).$$

In an example embodiment, the determining nominal interference for the serving cell e includes, $$I_{nominal}(e) = 10 \log(\exp(I_e)).$$

At least one example embodiment discloses a method of controlling interference between a plurality of user equipments (UEs) in a network including a plurality of cells, each of the cells being at least one of a serving cell and neighboring cell. The method includes determining whether a change in traffic across the network exceeds a threshold, obtaining first path loss data of communications between the UEs and serving cells and second path loss data of communications between the UEs and neighboring cells based on the change in traffic, determining first parameters and nominal transmit power parameters for the plurality of cells, respectively, based on the first path loss data and the second path loss data and determining nominal interferences for the plurality of cells, respectively, based on the respective first parameter and nominal transmit power parameter.

In an example embodiment, for each UE, the obtaining includes obtaining a mean path loss between the UE and the serving cell of the UE based on downlink RSRP measurements between the UE and the serving cell of the UE and obtaining a mean path loss between the UE and the neighboring cells of the UE based on downlink RSRP measurements between the UE and the neighboring cells.

In an example embodiment, the method further includes determining a joint Normal fit of a joint path loss distribution over a serving path loss and a neighboring path loss measurements reported by the plurality of the UEs, the determining first parameters and nominal transmit power parameters being based on the Normal fit of the variable.

In an example embodiment, a mean and a covariance matrix of the Normal fit are estimated via a Minimum Mean Square error criterion.

In an example embodiment, the determining first parameters and nominal transmit power parameters includes determining $$\max_{\{P_e\},\{\alpha_e\}} \sum_{u \in U} V(\gamma_u)$$

subject to, $$\gamma_u \leq P_e - (1 - \alpha_e)PathLoss(u \text{ to } e) - I_e, \forall u, u \in \text{cell-}e$$

$$I_c \geq \ln\left[\sum_{e \in \text{IntNghbr}(c)} e^{(\pi_e + \beta_c^t m_{ec} + \frac{1}{2}\beta_e^t C_{ec}\beta_e)} + N_0\right] \forall, \text{cell-}c$$

$$P_e + \alpha_e PathLoss(u \text{ to } e) \leq \ln P_{max}$$

$$\alpha_e \in [0, 1], \gamma_u \in [\gamma_{min}, \infty)$$

wherein $P_e$ is a nominal transmit power parameter for serving cell e, $\alpha_e$ is the first parameter for the serving cell e, u is the UE, $m_{ec}$ is the mean path loss vector between the serving cell e and the neighboring cell c, $C_{ec}$ is the covariance matrix, V is a utility function, and $I_c$ is an average interference at cell c, and $\gamma_u$ is a target signal-to-interference plus noise ratio of user u.

In an example embodiment, the nominal transmit power parameter for the serving cell e is $$P_0(e) = 10 \log(\exp(P_e)).$$

In an example embodiment, the determining nominal interference for the serving cell e includes, $$I_{nominal}(e) = 10 \log(\exp(I_e)).$$

Uplink (UL) performance is also important to benefit from the application of eICIC, but current releases (R10) do not allow the exploitation of ABS in the UL direction.

Consequently, in at least one example embodiment, the signaling already defined in 3GPP is extended, to provide more than one set of UL FPC parameters ($P_0$ and $\alpha$). The first set in applicable in the non-ABS subframes while the second set is applicable during the ABS frames. 3GPP currently provides for one cell-specific set of UL FPC parameters only.

At least one example embodiment discloses a method of controlling interference between a plurality of user equipments (UEs) in a serving macro cell having a plurality of small cells. The method includes obtaining a plurality of subframes in communication links between the serving macro cell and the UEs, obtaining a plurality of blank subframes within the plurality of subframes and determining a first set of power control parameters for communications by the UEs during the blank subframes and a second set of power control parameters for communications by the UEs during the remaining subframes of the plurality of subframes.

At least one example embodiment discloses, a server for controlling interference between a plurality of user equipments (UEs) in a network including a plurality of cells, each of the cells being at least one of a serving cell and neighboring cell, the server configured to obtain first path loss data of communications between the UEs and serving cells and second path loss data of communications between the UEs and neighboring cells, determine first parameters and nominal power parameters for the plurality of cells, respectively, based on the first path loss data and the second path loss data, and determine nominal interferences for the plurality of cells, respectively, based on the respective first parameter and nominal power parameter.

BRIEF DESCRIPTION OF THE DRAWINGS

Example embodiments will be more clearly understood from the following detailed description taken in conjunction with the accompanying drawings. FIGS. 1-7 represent non-limiting, example embodiments as described herein.

FIG. 2 illustrates a communication architecture according to an example embodiment;

FIG. 3 is a diagram illustrating an example structure of a wireless device;

FIG. 4A illustrates a method of controlling interference between a plurality of UEs in a network including a plurality of cells, each of the cells being at least one of a serving cell and a neighboring cell according to an example embodiment;

FIG. 4C illustrates an example embodiment of a step in the method of FIG. 4A;

FIG. 5 illustrates a method of controlling interference between a plurality of UEs in a network including a plurality of cells, each of the cells being at least one of a serving cell and a neighboring cell according to an example embodiment;

FIG. 6 illustrates an example embodiment of a transmission scheme in an LTE HetNet incorporating eICIC; and FIG. 7 illustrates a method of controlling interference between a plurality of UEs in a serving macro cell having a plurality of small cells according to an example embodiment.

DETAILED DESCRIPTION

Figure 1A:
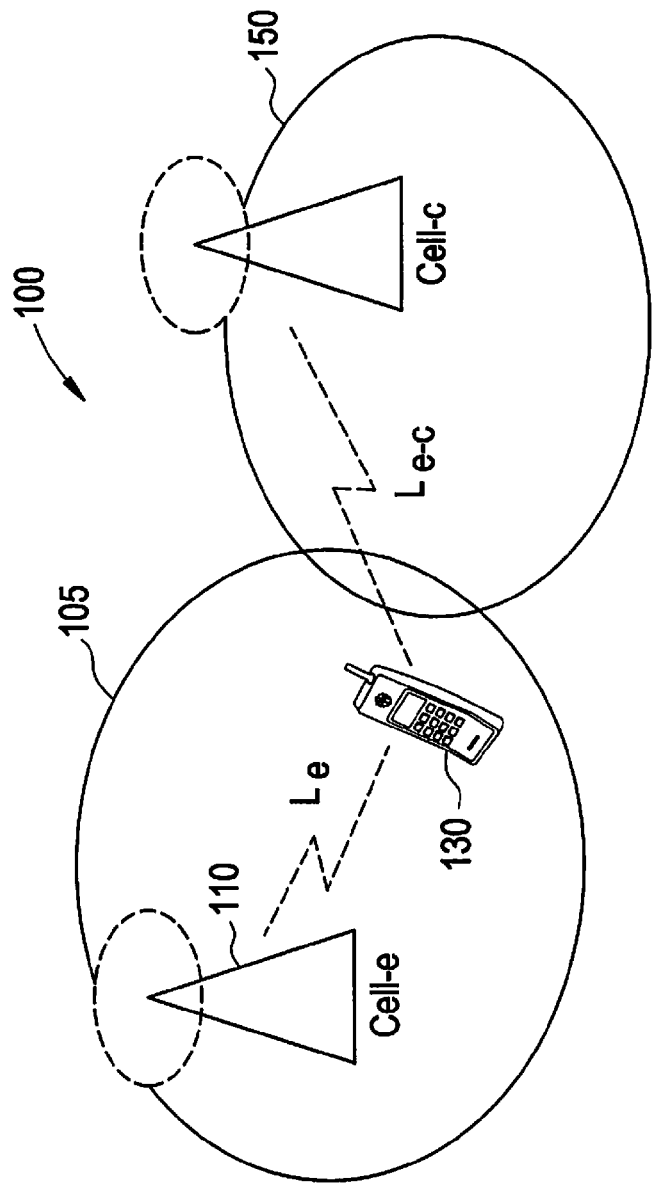
FIG. 1A illustrates a portion of a wireless communication system according to an embodiment.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

Communication from the base station to the UE is typically called downlink or forward link communication. Communication from the UE to the base station is typically called uplink or reverse link communication.

FIG. 1A illustrates a portion of a network according to an embodiment. The network shown in FIG. 1A may be a HetNet LTE network, but is not limited thereto. The network includes a plurality of macro cells 105, 150. While only two macro cells are shown, the network of FIG. 1A may include more than two macro cells. Each macro cell includes a macro base station cell-e(110) and cell-c. The macro base station 110 is a serving base station to a UE 130. As shown, while the macro base station 110 is the serving base station, there exists a pass loss $L_{e-c}$ between the UE and the cell-c. There also exists a path loss $L_e$ between the macro base station 110 and the UE 130.

Figure 1B:
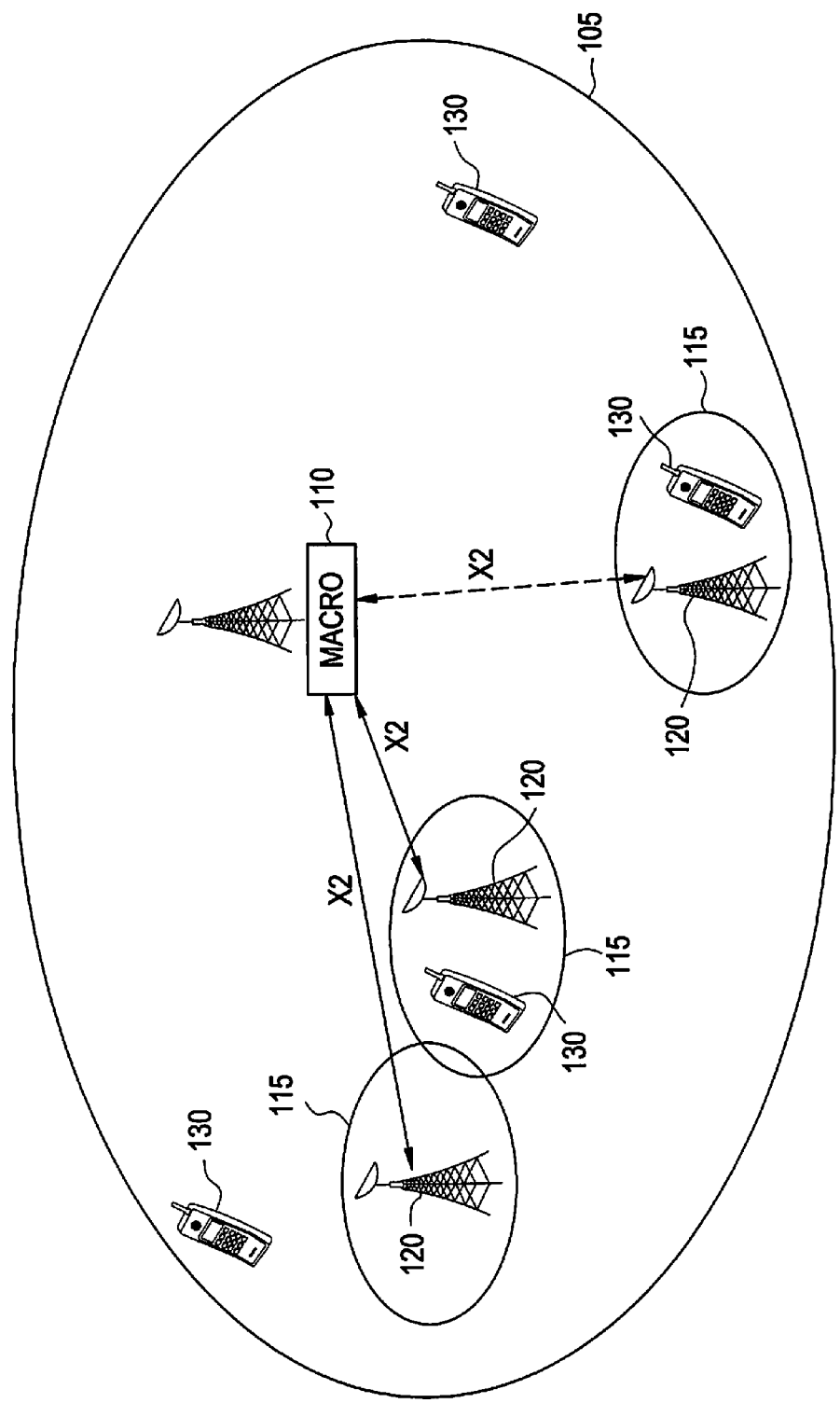
FIG. 1B illustrates a portion of a wireless communication system according to an embodiment.

FIG. 1B illustrates a more detailed view portion of a HetNet according to an embodiment. As shown, the HetNet includes the macro cell 105 served by the macro base station 110. The macro cell and macro base station may both be referred to as a macro cell or a macro. The macro cell includes a number of small cells 115 served by respective small cell base stations 120. In one embodiment, the macro and small cells are Long Term Evolution (LTE) macro and small cells. However, the embodiments are not limited to this radio access technology (RAT), and the macro and small cells may be of different RATs. Furthermore, the macro base station 110 and the small cell base stations 120 communicate with each other over X2 interfaces as shown in FIG. 1B. UEs 130 may be present in the macro and small cells.

FIG. 2 illustrates a communication architecture according to an example embodiment. As shown, the network 100 communicates with a computational server 205. Each base station cell-e, cell-c is configured to communicate topology and propagation data regarding the network 100 to the computational server 205 over a link 210. Moreover, the computational server 205 and the network 100 communicate traffic data and configuration parameters (e.g., $P_0$ and $\alpha$) over link 215. Between each base station cell-e and the computational server 205 is an Element Manager System (EMS) that is part of network management. The EMS (a) stores the measurements transmitted periodically by the network elements (e.g. $L_e$ and $L_{e-c}$) and (b) sends configuration instructions to the network elements. The computational server 205 obtains the measurements stored in the EMS via link 210 and the nature of this interface may be IP, Memory etc. The computational server 205 sends configuration parameters (e.g. $P_0$ and $\alpha$) to the EMS via link 215.

The EMS includes an operations, administration and maintenance (OAM) capabilities. The OAM capabilities allow the computational server to communicate with the LTE RAN 100 via a provisioning interface such as the link 210.

Using OAM capabilities, the EMS is responsible for the configuration, operations and maintenance of various RAN nodes. Various RAN and core network nodes communicate with the EMS through northbound interfaces (e.g., provisioning interface) that allow the EMS to download configuration data to the RAN and core network nodes and to obtain performance statistics from the RAN and core network nodes.

The computational server 205 communicates with the base stations of the LTE RAN as well as the other nodes of the core network (e.g., PRCF, which is not shown).

The computational server 205 is a network element or entity that enables application of radio frequency congestion control mechanisms (e.g., SON CCO algorithms and RAN Load Balancing) and core network congestion control mechanisms (e.g., policy-based functions) to be coordinated at a single network entity. Coordinating application of core network congestion control mechanisms and radio frequency congestion control mechanisms may improve congestion control and provide a more optimal response to network congestion. The operations and functionality of the computational server 205 will be described in more detail later.

In one example, the computational server 205 may be a conventional server or other computer device including one or more Central Processing Units (CPUs), digital signal processors (DSPs), application-specific-integrated-circuits, field programmable gate arrays (FPGAs) computers or the like configured to implement the functions and/or acts discussed herein. These terms in general may be referred to as processors.

The computational server 205 may be located in a centralized location in of the communication system, for example, at a layer above OAM node (element management system). Since the computational server 205 coordinates actions across multiple nodes, these multiple nodes communicate with the computational server 205 through northbound interfaces that allow each node to send performance counters to a centralized location.

The computational server 205 includes a database for network data. The database saves traffic load, SINR distribution at different cells and path loss distributions, for example. It is important to note that the database does not require exact location traffic hotspot and load. In general, a traffic intensity map can be coarse grained and simply available on a per-cell basis for different times in a day.

The computational server 205 may include an Alcatel-Lucent 9955 embedded network simulator, but should not be limited thereto. The 9955 network simulator is a commercial network simulator that is used to generate inputs used by an eICIC algorithm. The 9955 tool uses the traffic map, propagation map, and base station locations to generate multiple snapshots of UE locations. An example embodiment in FIG. 5 performs FPC parameter ($\alpha$ and $P_0$) computation for each of these snapshots and averages the output. This is similar to a Monte-carlo simulation that produces the "average" of configurations.

Figure 3:
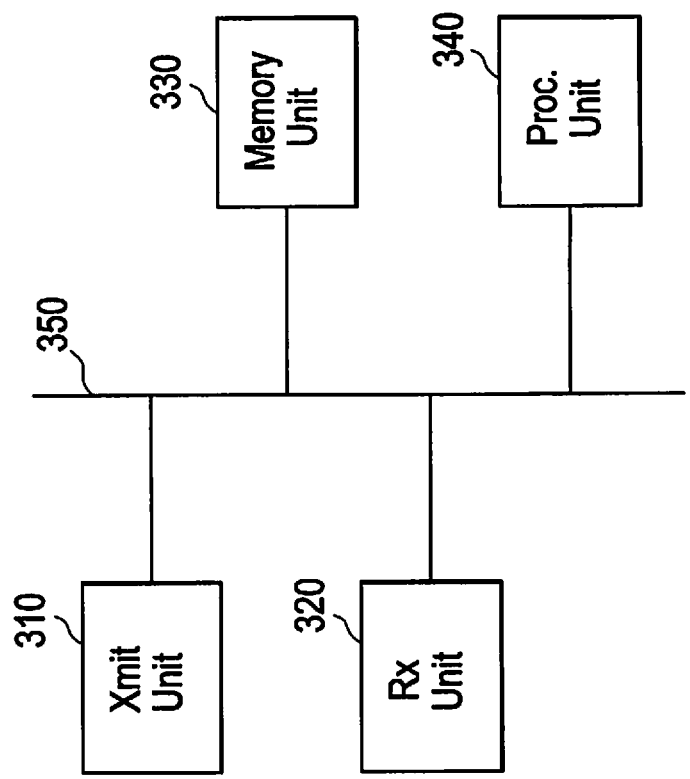

FIG. 3 is a diagram illustrating an example structure of a wireless device. The wireless device may be a user equipment (UE), a base station or computational server. The wireless device may include, for example, a transmitting unit 310, a receiving unit 320, a memory unit 330, a processing unit 340, and a data bus 350.

The transmitting unit 310, receiving unit 320, memory unit 330, and processing unit 340 may send data to and/or receive data from one another using the data bus 350. The transmitting unit 310 is a device that includes hardware and any necessary software for transmitting wireless signals including, for example, data signals, control signals, and signal strength/quality information via one or more wireless connections to other wireless devices.

The receiving unit 320 is a device that includes hardware and any necessary software for receiving wireless signals including, for example, data signals, control signals, and signal strength/quality information via one or more wireless connections from other wireless devices, The memory unit 330 may be any storage medium capable of storing data including magnetic storage, flash storage, etc.

The processing unit 340 may be any device capable of processing data including, for example, a microprocessor configured to carry out specific operations based on input data, or capable of executing instructions included in computer readable code.

For example, the processing unit 340 is capable of implementing the methods described in detail below.

Determining $P_0$ and $\alpha$

The determination of $P_0$ and $\alpha$ for a plurality of cells impact (i) interference caused to a cell by UEs from neighboring cells, and (ii) SINR target set by RRC (radio resource controller) for each UE through the choice of $P_0$, $\alpha$ and nominal interference at each cell.

$P_0$ depends on the UE with largest path loss to the server, and the choice of a gives rise to "fairness" within the communication system. A value of $\alpha=1$ makes average received powers of all UEs equal but it can be harmful to a neighboring cell if there are a lot of edge users. A value of $\alpha=0$ penalizes edge users but reduces interference to neighboring cells. Thus, the computational server 205 may set $\alpha$ and $P_0$ differently based on the spatial distribution of the users.

The choices of $P_0$ and $\alpha$ of a base station are coupled with SINR of UEs associated with the cell and the received interference power from neighboring cells. Thus, the determination of $P_0$ and $\alpha$ for different cells are solved jointly.

FIG. 4A illustrates a method of controlling interference between a plurality of UEs in a network including a plurality of cells, each of the cells being at least one of a serving cell and a neighboring cell. The method of FIG. 4A may be performed by the computation server 205, for example.

In example embodiments described below, $\alpha$ may be referred to as a first parameter and $P_0$ may be referred to as a nominal transmit power parameter.

At S405, the computational server obtains first path loss data and second path loss data from the UEs in the network (e.g., network 100). The first path loss data may be a mean serving cell path loss data $L_e$ and the second path loss data may be a collection neighboring cell path loss data $L_{e-c}$. Consequently, the neighboring cell path loss data $L_{e-c}$ reflects communications between UEs and neighboring cells in the network.

The mean serving cell path loss data $L_e$ is a mean path loss (i.e., averaging the effect of fast fading) from a UE (e.g., 130) to its serving cell (e.g., 110). The mean serving cell path loss data $L_e$ is a random variable of path loss of a typical user scheduled by the MAC of cell-e over an uplink resource block. The mean serving cell path loss data $L_e$ can be retrieved from UE downlink channel measurements such as Reference Signal Received Power (RSRP) since the computational server is aware of the transmit power of each cell.

The neighboring cell path loss data $L_{e-c}$ denotes the path loss from the UE to a neighboring cell. $L_{e-c}$ denotes the mean path loss from cell-e to some other cell-c of a scheduled UE of cell-e. $L_{e-c}$ is random since the scheduled used is random. For every interfering cell pairs (e,c) the UE (or computational server 205) maintains observations of $L_{e-c}$ (along with the identity of the scheduled user-u) as observed over a particular uplink resource block (same resource block as the one used in the measurement of $L_e$).

Information of UEs cross losses (to some other server) is available because each UE knows the downlink RSRP from nearby servers. The RSRP values from the neighboring cells can be compared with the RSRP and path loss from the UE's serving cell to obtain the path loss to neighboring cells. The RSRP values may be generated using RRC messages or the computational server, for example.

With regards to RRC messages, the UE sends to a E-UTRAN RRC, measurements governed by, a measurement-type on a measurement object according to a reporting configuration (reportConfig) and a quantity configuration. ReportConfig is known and defined in standards and, therefore, will not be described in greater detail.

The UE can be requested to perform intra-frequency measurements (e.g., measurements at the downlink carrier frequency(ies) of the serving cell(s)). For intra-frequency measurements, a measurement object is a single E-UTRA carrier frequency. The report will be sent according to a reporting configuration that specifies (a) a trigger criterion and (b) a format. The trigger criterion can either be periodical or event-based. The reporting format includes the quantities that the UE includes in the measurement report and associated information (e.g. number of cells to report).

The UE identifies each measurement report with a measurement ID and includes the ID in the measurement report. The measurement IDs is the link in a bi-partite graph between the measurement objects and reporting configurations. By configuring multiple measurement IDS, the UE links more than one measurement object to the same reporting configuration, as well as links more than one reporting configuration to the same measurement object.

The quantity configuration defines the measurement quantities and associated filtering used for all event evaluation and related reporting of that measurement type. One filter can be configured per measurement quantity.

The UE maintains a single measurement object list, a single reporting configuration list, and a single measurement identities list. The measurement procedures distinguish the following types of cells (1) the serving cell(s), (2) listed cells which are cells listed within the measurement object(s), and (3) detected cells which are cells that are not listed within the measurement object(s) but are detected by the UE on the carrier frequency(ies) indicated by the measurement object(s).

The UE measures and reports on the serving cell(s), listed cells and detected cells.

The RRC can configure the UE in the ReportConfig message to include a purpose set to ReportStrongestCellsForSON. In this case, the UE will consider any neighboring cell detected to be applicable and send RSRP and/or RSRQ measurements with its measurement report.

The measurements can be reported periodically or based on an event.

The computational server may generate the RSRP values by obtaining a traffic load distribution along with the network topology. The computational server calculates RSRP values by prediction methods of path losses (propagation models) for the specific UE locations that are determined by considering traffic load distributions. Propagation models are well known in the art. Network topology is a-priori given and includes geolocations of cells, antenna orientations and antenna patterns.

At S405, the computational server may also obtain a mean activity of each user u, O(u). The mean activity of each user O(u) denotes a probability with which a user gets to transmit over any given uplink resource block. In the specific case of proportional fairness scheduler at cell and identical QoS levels along with always-full buffer (as in a video streaming application) data for all users, O(u)=1/(a number of uplink users in the serving cell). In general, u can depend on mix of applications, burstiness of traffic, etc. For example, in an application mix with different weights and the scheduler is a weighted proportional fair scheduler, then each user u is proportional to the weight. In general, each serving cell tracks the activity period of a typical uplink resource block. The default value can be taken as 1/(the number of uplink users).

At S410, the computational server determines first parameters and nominal transmit power parameters for the plurality of cells, respectively, based on the first path loss data and the second path loss data.

Figure 4B:
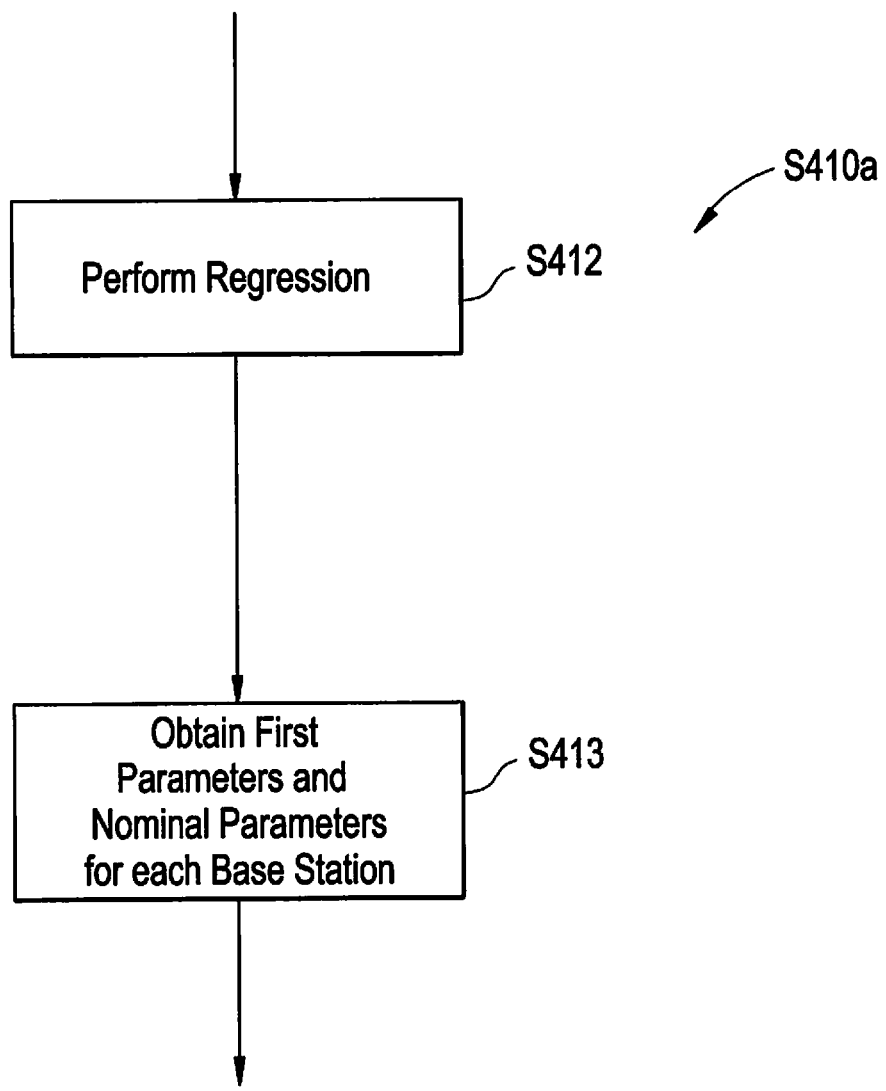
FIG. 4B illustrates an example embodiment of a step in the method of FIG. 4A.

FIG. 4B illustrates an example embodiment of S410. At S412, the computational server performs regression to fit a jointly log-normal distribution for the tuple (serving cell path loss, neighboring cell path loss) for each cell pair.

At S412, for each interfering cell pair (e,c), the computational server uses the mean serving cell path loss data $L_e$ and neighboring cell path loss data $L_{e-c}$ of all UEs of cell-e to obtain a normal fit of a random variable $$Z(e,c)=(\ln L(e), \ln L(e,c)) \quad (1)$$

based empirical observations of L(e)'s and L(e,c)'s. The computational server may determine Z(e,c) as follows.

The computational server determines an empirical mean cross loss. For every cell pair (e,c), the log of the path loss observations ln(L(e)), ln(L(e,c) (collected in measurement step) is averaged over all observations to compute an empirical mean path loss vector $$m(e,c)=[m(e,c)(1) m(e,c)(2)] \quad (2)$$

where $$m(e,c)(1)=\text{SampleAvg}(\ln(L(e)) \quad (3)$$

and $$m(e,c)(2)=\text{SampleAvg}(\ln(L(e,c))). \quad (4)$$

The computational server determines an empirical mean cross loss. For every cell pair (e,c), the computational server determines an empirical loss 2×2 covariance matrix C(e,c), where (i,j)-th, element of the matrix for i,j=1, 2 are as follows:

$$C(e,c)(1,1)=\text{SampleVariance}(\ln L(e)) \quad (5)$$

$$C(e,c)(2,2)=\text{SampleVariance}(\ln L(e,c)) \quad (6)$$

$$C(e,c)(1,2)=C(e,c)(2,1)=\text{SampleAvg}(L(e)*L(e,c))-\text{SampleAvg}(L(e))*\text{SampleAvg}(L(e,c)) \quad (7)$$

The 2 dimensional random variable Z(e,c) is modeled as Gaussian with mean m(e,c) and covariance matrix C(e,c).

Based on the above computations of C(e,c) and m(e,c), the computational server solves a convex non-linear program Interference over Thermal Control-CE (IoTC-CE) at S413 as:

$$IoTC\text{-}CE: \quad (8)$$

$$\max_{\{P_e\},\{\alpha_e\}} \sum_{u \in U} V(\gamma_u)$$

subject to, $$\gamma_u \leq P_e - (1-\alpha_e)PathLoss(u \text{ to } e) - I_e, \forall u, u \in \text{cell-}e$$

$$I_c \geq \ln\left[\sum_{e \in IntNghbr(c)} e^{(\pi_e + \beta_c^t m_{ec} + \frac{1}{2}\beta_c^t C_{ec}\beta_e)} + N_0\right] \forall, \text{cell-}c$$

$$P_e + \alpha_e PathLoss(u \text{ to } e) \leq \ln P_{max}$$

$$\alpha_e \in [0,1], \gamma_u \in [\gamma_{min}, \infty)$$

wherein $P_e$ is a nominal transmit power parameter for serving cell e, $\alpha_e$ is the first parameter for the serving cell e, u is the UE, $m_{ec}$ is the mean path loss vector between the serving cell e and the neighboring cell c, $C_{ec}$ is the covariance matrix, V is a utility function (i.e., a function that translates SINR to a value (a real number) that represents the utility of a commodity (rate) to a user), βc denotes a vector $(\alpha_c, -1)^t$ where t is the transpose operator, $I_c$ is an average interference at cell c, and γu is a target signal-to-interference plus noise ratio of user u.

The first constraint in equation (8) is the SINR constraint of a user u and the second constraint is the cell's average interference constraint based on the distribution of Z(e,c).

Equation (8) produces $\alpha_e$. Moreover, at S413, the computational server determines $P_0$ as:

$$P_0(e)=10 \log(\exp(P_e)) \quad (9)$$

in dB scale.

As a by-product of solving IoTC-CE, the computational server also obtains interference $I_e$. At S415, the computational server sets a nominal interference at cell-e is set as:

$$I_{nominal}(e)=10 \log(\exp(I_e)) \quad (10)$$

The nominal interference $I_{nominal}(e)$ can be used to set the target SINR for any user.

FIG. 4C illustrates another example embodiment of S410. At S420, the computational server initializes a primal vector z and a dual vector p. Both the primal vector z size and the dual vector p size are equal to the sum of the number of cells and the number of UEs.

The following variable transformations are used in FIG. 4C $$\gamma_u = \mathbb{E}[\ln SINR_\alpha], \theta_e = \mathbb{E}[\ln I_e]$$

$$\pi_e = \ln P_e, \lambda_e^{(u)} = \ln l_e^{(u)}, \lambda_{e \to c}^{(u)} = \ln l_{e \to c}^{(u)}$$

$$\Lambda_e = \ln L_e, \Lambda_{e \to c} = \ln L_{e \to c}$$

At S425, for each cell-e the computational server generates a random representative interferer. A UE within the cell-e is randomly determined as the interferer whose received power at all neighboring cells is the interference power from cell-e. The interference signal from the UE interferer to all the neighboring cells is chosen by the computational server as the value of interference for this iteration.

At S430, the computation server generates an inter-cell interference matrix based on the random interferer for each cell. The strength of the interference signal can be computed based in the UE path loss measurement at S405.

At S435 and S440, the variables of the primal vector z and the dual vector p are updated. As will be described below, the primal vector z and the dual vector p both contain both cell and UE-dependent quantities.

More specifically, once the random sample of an interferer from each cell is determined, the interference becomes a deterministic quantity. Thus, knowing the identity of the interferers, $L_e$ and $L_{e-c}$ are deterministic quantities instead of random. Consequently, the computational server updates the primal variable z and the dual variable p for each cell as follows:

$$\text{IoTC-CP} \quad (12)$$

$$\max_{\{\pi_e\},\{\alpha_e\}} \sum_{u \in U} V(\gamma_u)$$

subject to, $$\forall c, u \in U_c: \gamma_u \leq \pi_c - (1-\alpha_c)\lambda_c^{(u)} - \theta_c$$

$$\forall c \in \varepsilon: \theta_c \geq \ln\left(\sum_{e \in J_c} O_e e^{(\pi_e + \alpha_e \Lambda_e - \Lambda_{e \to c})} + N_0\right)$$

$$\forall e, u \in U_e: \pi_e + \alpha_e \lambda_e^{(u)} \leq \ln P_{max}$$

$$\alpha_e \in [0,1], \gamma_u \in [\gamma_{min}, \infty)$$

The variables of the primal vector z can be updated as follows:

$$z_{n+1} = z_n + \alpha_n \Lambda_z \mathcal{L}(z_n, h(z_n, \chi, \xi), p_n) \quad (13)$$

where, L(.) denotes the lagrangian of the IoTC-Convex Program (CP), $\nabla_n$ denotes the gradient of the lagrangian with respect to the primal vector z, x is a draw from a binary random variable that denotes whether the specific cell, interferers with the cell of interest, $\xi$ is a random draw of the joint path loss distribution $(L_e, L_{e-c})$, $a_n$ is the step size that is set to a series that generates convergence. There are well known methods in the art to set $a_n$. Similarly the variables of the dual vector p can be updated as $$p_{n+1} = [p_n + \alpha_n h(z_n, \chi, \xi)]^+ \quad (14)$$

where h(.) denotes the vector of constraints in IoTC-CP, h(.) is the vector after rewriting the equation (12) with the left hand side (LHS) containing all inequality expressions in the form LHS<=0. h( ) is the vector containing all LHS terms.

At S445, the computational server determines whether the FPC parameters have stabilized. Convergence of stochastic algorithms is determined based on well known in the art stopping criteria. If the FPC parameters are not stable, S425-S440 are performed again. Once the FPC parameters are stable, the first parameters and nominal transmit parameters are obtained by averaging the $P_0$ and $\alpha$ values from each iteration at S450.

Figure 5:
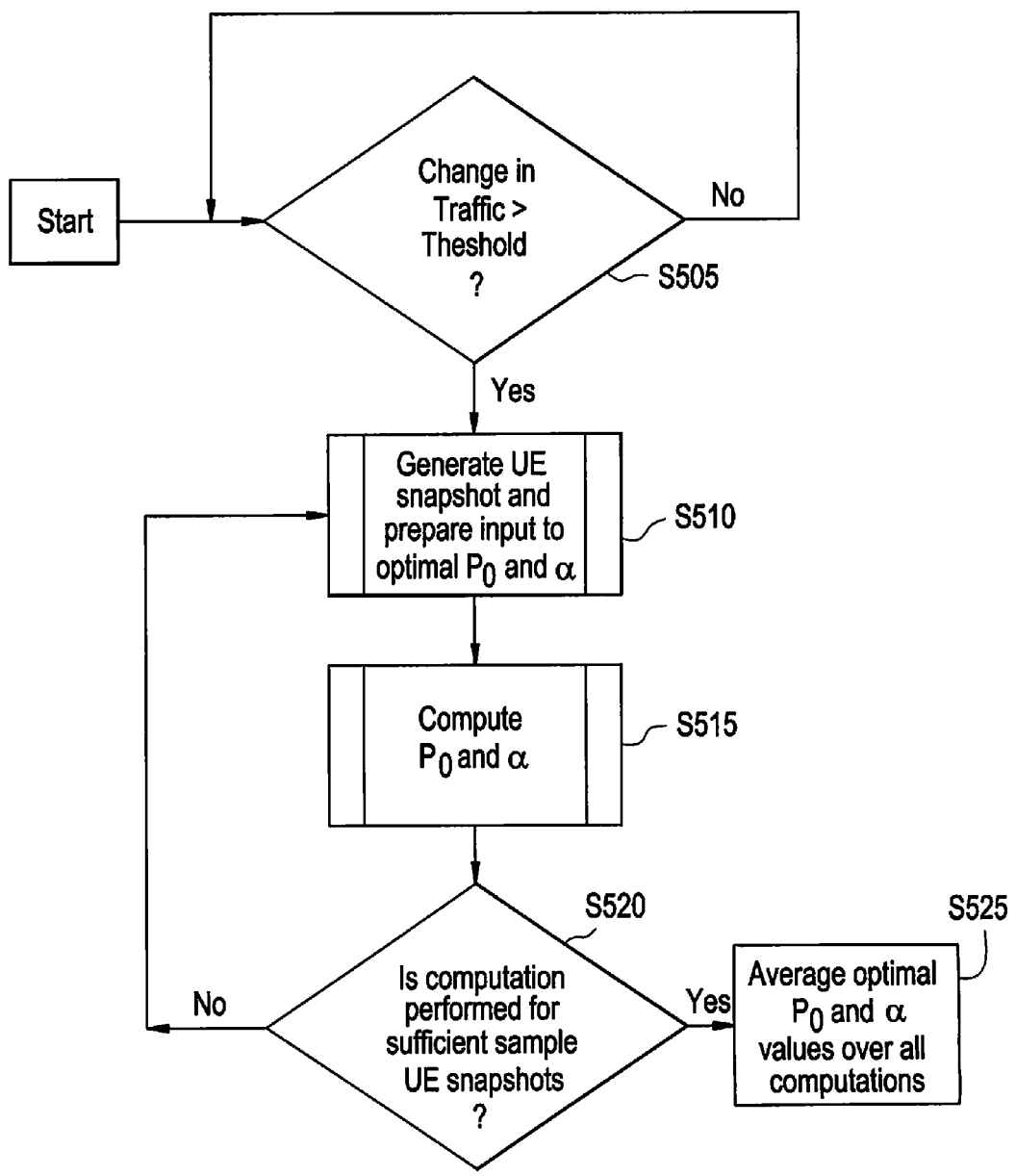

FIG. 5 illustrates a method of controlling interference between a plurality of UEs in a network including a plurality of cells, each of the cells being at least one of a serving cell and a neighboring cell. The method of FIG. 5 may be performed by the computational server 205, for example.

At S505, the computational server determines whether a change in traffic exceeds a threshold. If the change in traffic does not exceed a threshold, the computational server continues to monitor network traffic.

If the change in traffic exceeds a threshold, the computational server generates UE locations based on the SINR distribution and traffic intensity profiles in different cells, at S510.

At S515, the computational server determines $P_0$ and $\alpha$ values for the plurality of cells, respectively. The step at S515 is the same as the method described in FIG. 4. Therefore, for the sake of brevity, step S515 will not be described in further detail.

At S520, the computational server determines whether S510 and S515 should be performed again. The computational server may determine whether S510 and S515 should be performed again using a variety of methods. In one embodiment a thresholding method is applied, in which the traffic intensity change of one or more cells is compared against a threshold. If the change of traffic intensity is above a threshold, then the computational server may decide a re-optimization. At S525, the determined $P_0$ and $\alpha$ values are averaged over all computations.

As described in FIGS. 4 and 5, cell specific FPC parameters are determined. In conventional art, a network wide value of $\alpha$ is generated and thus fails to account for hotspot/UE location in different cells. At least one example embodiment accounts for the dependence of propagation map, traffic map/hotspot location on the parameters of FPC. Since traffic map could be different at different times of the day, the example embodiment can find optimal configuration at different times of the day. Moreover, at least one example embodiment considers the entire the network instead of each cell in isolation. A configuration in one cell can affect the adjacent cell's performance and there could be a ripple effect throughout the network which our solution accounts for.

Determining $P_0$ and $\alpha$ for ABS and Non-ABS

Figure 6:
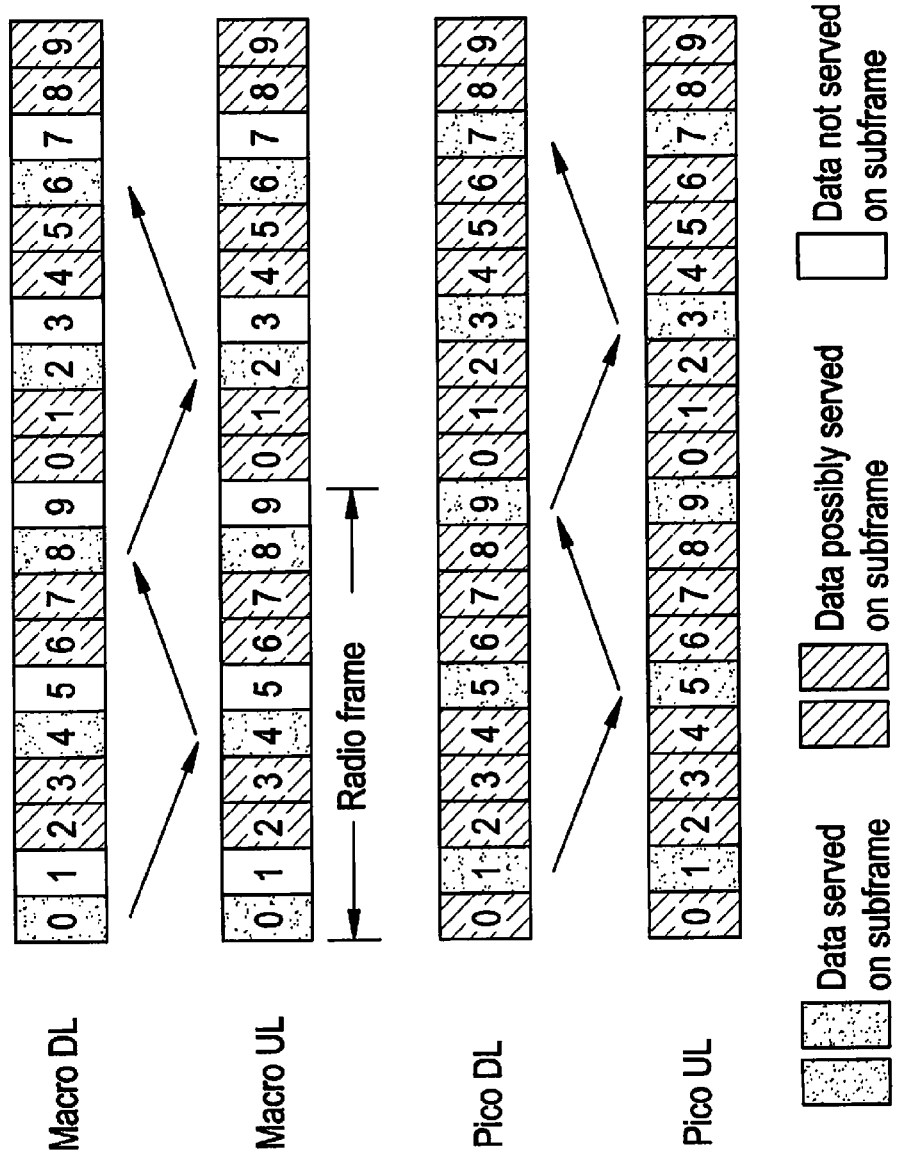

FIG. 6 illustrates an example embodiment of a transmission scheme in an LTE HetNet incorporating eICIC.

As shown, eICIC ABS transmissions by the macro in the DL, create not only DL opportunities in the small cell layers DL, but also UL reception opportunities.

Since there are no UL PDCCH assignments in the macros during each of the ABS subframe n, n+4 subframes later, UL transmission opportunities are being created for the small cells. This means that small cells can schedule UL assignments with much higher MCSs (spectral efficiency) due to the fact that there are no UL macro users transmitted during these subframes.

Figure 7:
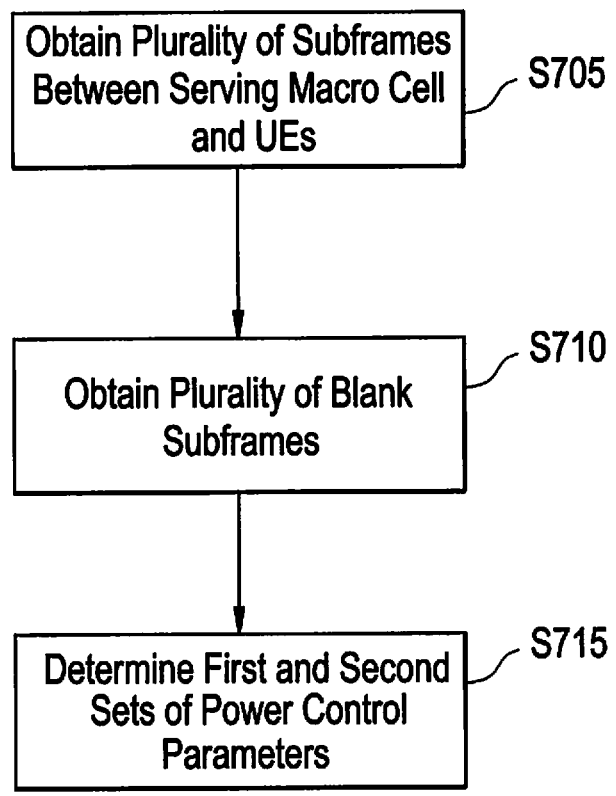

FIG. 7 illustrates a method of controlling interference between a plurality of UEs in a serving macro cell having a plurality of small cells according to an example embodiment. The method of FIG. 7 may be performed by the computation server 205, for example.

At S705, the computational server obtains the plurality of subframes between the serving macro cell and the UEs. At S710, the computational server determines the blank subframes within the plurality of subframes.

At S715, the computational server determines a first set of power control parameters ($P_0$ and $\alpha$) for communications by the UEs during the blank subframes and a second set of power control parameters ($P_0$ and $\alpha$) for communications by the UEs during the remaining subframes of the plurality of subframes. Each of the first set and second set of power control parameters are determined in accordance with any one of the example embodiments described above. Consequently, measurements are obtained by the computational server during black subframes (ABS) and non-blank subframes.

More specifically, the signaling already defined in 3GPP is extended to provide more than one set of UL FPC parameters ($P_0$ and a). The computational server determines a first set of each macro cell will be applicable in the non-ABS subframes while the computational server determines a second set for the macro cell will be applicable during the ABS frames. 3GPP currently provides for one cell-specific set of UL FPC parameters only.

In an example embodiment, the change to the Power Control Parameters in RRC specification 36.331 are as follows:

```
UplinkPowerControlCommon-r11 ::= SEQUENCE {
p0-NominalPUSCH-ABS    INTEGER (-126..24),
alpha-ABS      ENUMERATED {a10, a104, a105, a106, a107, a108,
a109, a11},
p0-NominalPUCCH-ABS    INTEGER (-127..-96),
p0-NominalPUSCH-NABS   INTEGER (-126..24),
alpha-NABS     ENUMERATED {a10, a104, a105, a106, a107, a108,
a109, a11},
p0-NominalPUCCH-NABS   INTEGER (-127..-96),
deltaFList-PUCCH   DeltaFList-PUCCH,
deltaPreambleMsg3   INTEGER (-1..6)
}
UplinkPowerControlDedicated-r11 ::= SEQUENCE {
p0-UE-PUSCH-ABS     INTEGER (-8..7),
p0-UE-PUSCH-NABS    INTEGER (-8..7),
deltaMCS-Enabled    ENUMERATED {en0, en1},
accumulationEnabled  BOOLEAN,
p0-UE-PUCCH-ABS     INTEGER (-8..7),
p0-UE-PUCCH-NABS    INTEGER (-8..7),
pSRS-Offset     INTEGER (0..15),
filterCoefficient    FilterCoefficient   DEFAULT fc4
p0-UE-PUSCH-NABS    INTEGER (-8..7),
p0-UE-PUCCH-NABS    INTEGER (-8..7),
p0-UE-PUSCH-ABS     INTEGER (-8..7),
p0-UE-PUCCH-ABS     INTEGER (-8..7),
}
```

As shown above, NABS denotes corresponding quantities for Non-ABS subframes and ABS denotes the corresponding quantities for ABS subframes. The above changes introduce two pairs of $P_0$ and $\alpha$ parameters for common (same across UEs) and dedicated (to each UE) power control policies.

In another example embodiment, the computational server schedules in the UL a more aggressive Modulation and Coding Scheme (MCS) based on the knowledge of the neighboring ABS patterns. The premise is based on the claim that the cell receiver can estimate the received SINR gain during the ABS and calculate the increased spectral efficiency. A Quality Control Loop (QCL) can correct for possible errors in this estimate. This loop will slowly converge if the traffic model helps, e.g., for FTP-traffic, a threshold number of CRC events are present to correct for possible systematic estimation errors of the SINR target.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling interference between a plurality of user equipments (UEs) in a network including a plurality of cells, each of the cells being at least one of a serving cell and neighboring cell, the method comprising:

obtaining first path loss data of communications between the UEs and serving cells and second path loss data of communications between the UEs and neighboring cells;

determining first parameters and nominal power parameters for the plurality of cells, respectively, based on the first path loss data and the second path loss data;

determining nominal interferences for the plurality of cells, respectively, based on the respective first parameter and nominal power parameter; and determining a joint normal fit of a joint path loss distribution over a serving path loss and a neighboring path loss measurements reported by the plurality of the UEs, the determining the first parameters and the nominal power parameters being based on the joint normal fit, the joint normal fit being a normal fit of a random variable based on the serving path loss measurement and the neighboring path loss measurement.

2. The method of claim 1, wherein for each UE, the obtaining includes, obtaining a mean path loss between the UE and the serving cell of the UE based on downlink reference signal received power (RSRP) measurements between the UE and the serving cell of the UE, and obtaining a mean path loss between the UE and the neighboring cells of the UE based on downlink RSRP measurements between the UE and the neighboring cells.

3. The method of claim 1, wherein a mean and a covariance matrix of the joint normal fit are estimated via a Minimum Mean Square error criterion.

4. The method of claim 3, wherein the determining first parameters and nominal power parameters includes determining $$\max_{\{P_e\},\{\alpha_e\}} \sum_{u \in U} V(\gamma_u)$$

subject to, $$\gamma_u \leq P_e - (1 - \alpha_e)PathLoss(u \text{ to } e) - I_e, \forall\, u, u \in \text{cell-}e$$

$$I_c \geq \ln\left[\sum_{e \in IntNghbr(c)} e^{(\pi_e + \beta_c^t m_{ec} + \frac{1}{2}\beta_e^t C_{ec}\beta_e)} + N_0\right] \forall,\, \text{cell-}c$$

$$P_e + \alpha_e PathLoss(u \text{ to } e) \leq \ln P_{max}$$

$$\alpha_e \in [0, 1],\, \gamma_u \in [\gamma_{min}, \infty)$$

wherein $P_e$ is a nominal power parameter for serving cell e, $\alpha_e$ is the first parameter for the serving cell e, u is the UE, $m_{ec}$ is the mean path loss vector between the serving cell e and the neighboring cell c, $C_{ec}$ is the covariance matrix, V is a utility function, and $I_c$ is an average interference at cell c, and $\gamma_u$ is a target signal-to-interference plus noise ratio of user u.

5. The method of claim 4, wherein the nominal power parameter for the serving cell e is $P_0(e) = 10 \log(\exp(P_e))$.

6. The method of claim 4, wherein the determining nominal interference for the serving cell e includes, $I_{nominal}(e) = 10 \log(\exp(I_e))$.

7. A method of controlling interference between a plurality of user equipments (UEs) in a network including a plurality of cells, each of the cells being at least one of a serving cell and neighboring cell, the method comprising:

determining whether a change in traffic across the network exceeds a threshold;

obtaining first path loss data of communications between the UEs and serving cells and second path loss data of communications between the UEs and neighboring cells based on the change in traffic;

determining first parameters and nominal power parameters for the plurality of cells, respectively, based on the first path loss data and the second path loss data;

determining nominal interferences for the plurality of cells, respectively, based on the respective first parameter and nominal power parameter; and determining a joint normal fit of a joint path loss distribution over a serving path loss and a neighboring path loss measurements reported by the plurality of the UEs, the determining the first parameters and the nominal power parameters being based on the joint normal fit, the joint normal fit being a normal fit of a random variable based on the serving path loss measurement and the neighboring path loss measurement.

8. The method of claim 7, wherein for each UE, the obtaining includes, obtaining a mean path loss between the UE and the serving cell of the UE based on downlink reference signal received power (RSRP) measurements between the UE and the serving cell of the UE, and obtaining a mean path loss between the UE and the neighboring cells of the UE based on downlink RSRP measurements between the UE and the neighboring cells.

9. The method of claim 7, wherein a mean and a covariance matrix of the joint normal fit are estimated via a Minimum Mean Square error criterion.

10. The method of claim 9, wherein the determining first parameters and nominal power parameters includes determining $$\max_{\{P_e\},\{\alpha_e\}} \sum_{u \in U} V(\gamma_u)$$

subject to, $$\gamma_u \le P_e - (1 - \alpha_e) PathLoss(u \text{ to } e) - I_e, \forall u, u \in \text{cell-}e$$

$$I_c \ge \ln\left[\sum_{e \in IntNghbr(c)} e^{(\pi_e + \beta_c^t m_{ec} + \frac{1}{2}\beta_e^t C_{ec}\beta_e)} + N_0\right] \forall, \text{cell-}c$$

$$P_e + \alpha_e PathLoss(u \text{ to } e) \le \ln P_{max}$$

$$\alpha_e \in [0, 1], \gamma_u \in [\gamma_{min}, \infty)$$

wherein $P_e$ is a nominal power parameter for serving cell e, $\alpha_e$ is the first parameter for the serving cell e, u is the UE, $m_{ec}$ is the mean path loss vector between the serving cell e and the neighboring cell c, $C_{ec}$ is the covariance matrix, V is a utility function, and $I_c$ is an average interference at cell c, and $\gamma_u$ is a target signal-to-interference plus noise ratio of user u.

11. The method of claim 10, wherein the nominal power parameter for the serving cell e is $P_0(e) = 10 \log(\exp(P_e))$.

12. The method of claim 10, wherein the determining nominal interference for the serving cell e includes, $I_{nominal}(e) = 10 \log(\exp(I_e))$.

13. A method of controlling interference between a plurality of user equipments (UEs) in a serving macro cell having a plurality of small cells, the method comprising:

obtaining a plurality of subframes in communication links between the serving macro cell and the UEs;

obtaining a plurality of blank subframes within the plurality of subframes; and determining a first set of power control parameters for communications by the UEs during the blank subframes and a second set of power control parameters for communications by the UEs during the remaining subframes of the plurality of subframes; and determining a joint normal fit of a joint path loss distribution over a serving path loss and a neighboring path loss measurements reported by the plurality of the UEs, the determining the second set of power control parameters being based on the joint normal fit, the joint normal fit being a normal fit of a random variable based on the serving path loss measurement and the neighboring path loss measurement.

14. A server for controlling interference between a plurality of user equipments (UEs) in a network including a plurality of cells, each of the cells being at least one of a serving cell and neighboring cell, the server configured to, obtain first path loss data of communications between the UEs and serving cells and second path loss data of communications between the UEs and neighboring cells, determine first parameters and nominal power parameters for the plurality of cells, respectively, based on the first path loss data and the second path loss data, determine nominal interferences for the plurality of cells, respectively, based on the respective first parameter and nominal power parameter, and determine a joint normal fit of a joint path loss distribution over a serving path loss and a neighboring path loss measurements reported by the plurality of the UEs, the determine the first parameters and the nominal power parameters being based on the joint normal fit, the joint normal fit being a normal fit of a random variable based on the serving path loss measurement and the neighboring path loss measurement.

\* \* \* \* \*